Aug. 30, 1966          W. C. BELK          3,269,430
BAG SECURING APPARATUS
Original Filed June 17, 1957                    2 Sheets-Sheet 2
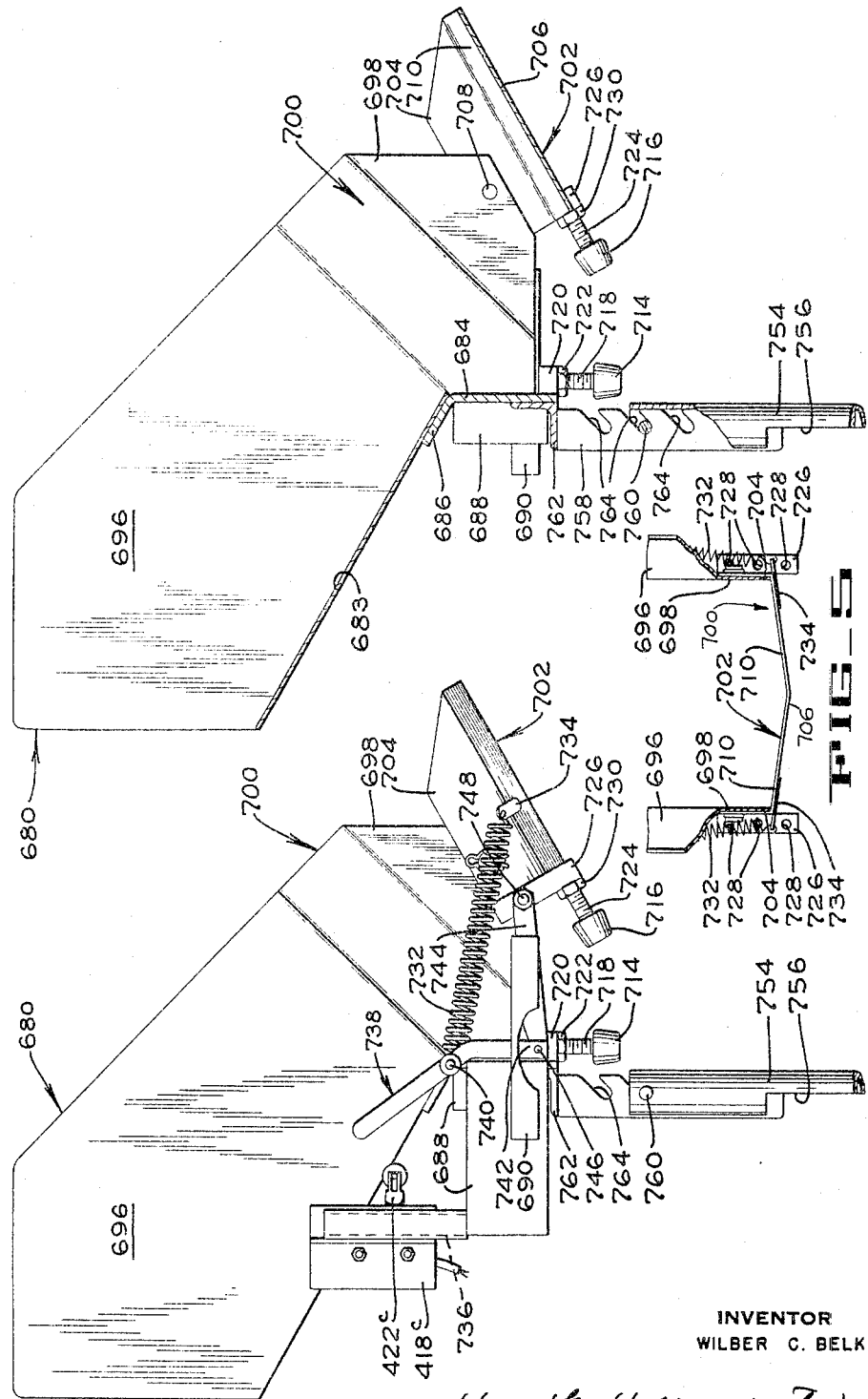
INVENTOR
WILBER C. BELK
BY Hans G. Hoffmeister
ATTORNEY 3,269,430
BAG SECURING APPARATUS
Wilber C. Belk, Lakeland, Fla., assignor to FMC Corporation, a corporation of Delaware
Application May 4, 1962, Ser. No. 192,534, which is a division of application Ser. No. 666,018, June 17, 1957, now Patent No. 3,072,207, dated Jan. 8, 1963. Divided and this application May 13, 1965, Ser. No. 473,256
5 Claims. (Cl. 141—315)

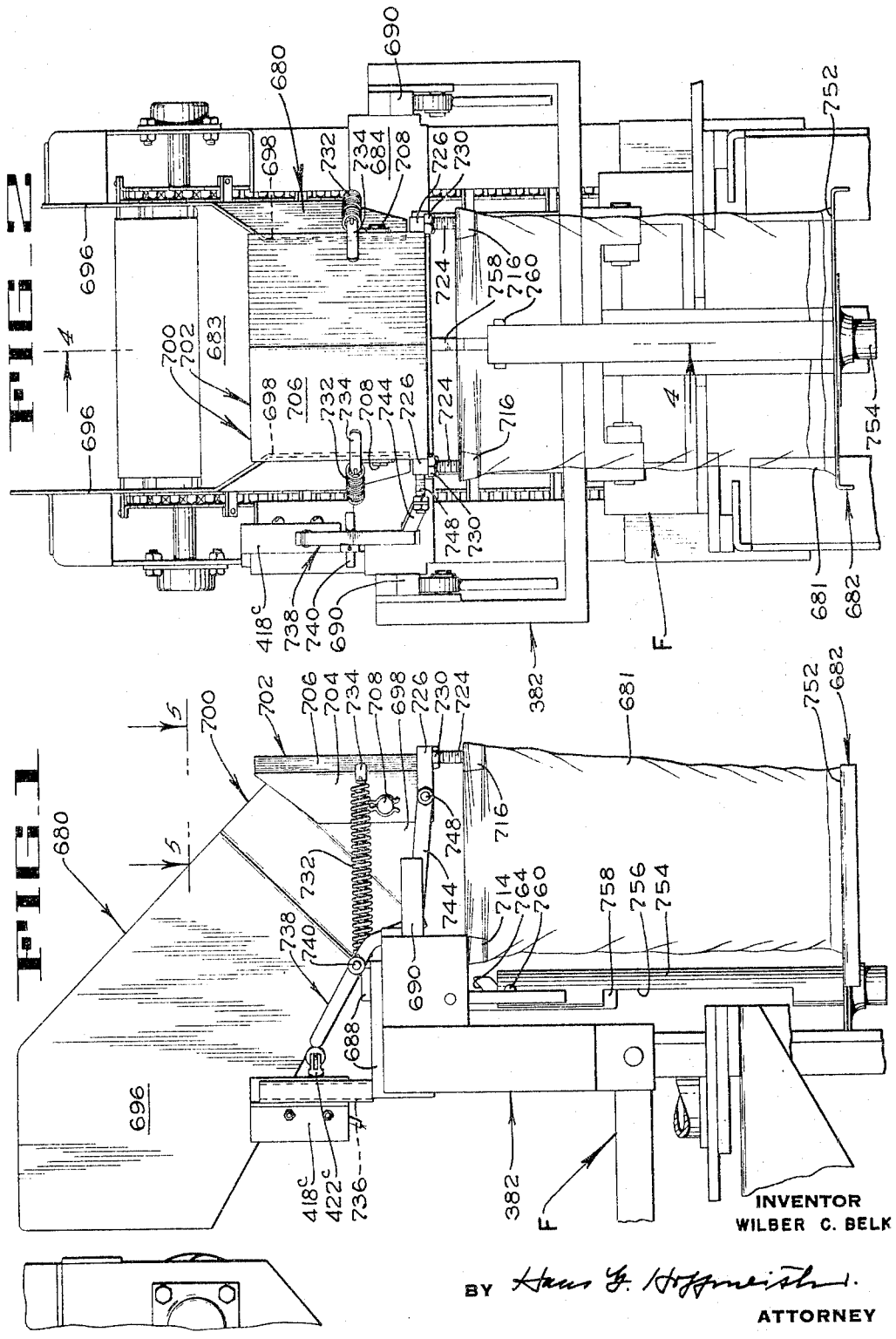

This is a division of the pending application of Wilber C. Belk, Serial No. 192,534, filed May 4, 1962, which is a division of an application of Wilber C. Belk, Serial No. 666,018, filed July 17, 1957, now Patent No. 3,072,207.

The present invention pertains to apparatus for weighing and bagging articles and relates more particularly to a hopper used in such apparatus to receive the articles to be weighed.

An object of the present invention is to provide an improved article receiving hopper adapted for use in an article weighing and bag filling machine.

Another object is to provide means in article weighing hopper for varying its capacity.

Another object is to provide improved means in an article receiving hopper for releasably retaining a bag in article receiving position on the hopper.

Another object is to provide improved means in an article receiving hopper structure including a bag support which is adjustable with respect to a movably mounted hopper.

Another object is to provide improved means for operatively mounting an article receiving hopper in a bag filling machine.

These and other objects and advantages will become apparent from the following description taken in connection with the accompanying drawings, in which:

FIGS. 1 and 2 are fragmentary side and rear elevations, respectively, of an article handling apparatus.

FIG. 3 is a side elevation of the hopper of FIG. 1, showing the same in a different operative position.

FIG. 4 is a vertical longitudinal section taken along the line 4—4 of FIG. 2, showing the hopper in the position shown in FIG. 3.

FIG. 5 is a fragmentary horizontal section, the view being taken along line 5—5 of FIG. 1.

The over-all bag filling machine is described in the above-mentioned applications. The subject invention is directed at a part of the over-all machine only and thus the details of the over-all machine will not be described herein. Generally, one embodiment of a bag filling machine with which the subject invention is applicable receives articles, such as, fruit, from a supply bin and moves them to a hopper 680. The articles are then discharged into a bag 681 which continues to be filled until a predetermined weight is attained. The subject invention is particularly useful for bagging large fruit.

In the operation of bagging oranges or any of the larger citrus fruit, it is advantageous to place the fruit in the bag directly, one or two at a time, rather than to discharge a pre-weighed quantity of fruit at one time into a bag. In the present invention, the hopper 680 (FIG. 1) is arranged to guide the fruit directly into the bag 681 which is supported by a platform 682. The platform is carried by the structure that mounts the hopper on the U-shaped bracket 382 of the machine. Accordingly, as the weight of the oranges in the bag increases, the platform 682 and the hopper 680 move downwardly together to actuate the scale switch.

Referring to FIG. 4, the hopper 680 comprises a downwardly and rearwardly inclined floor 683 which is fixedly attached to a flat support member 684 by means of a forwardly directed lip 686. The member 684 is disposed transversely of the hopper and is formed adjacent its ends with vertically disposed plates 688 that extend forwardly from the member 684. The plates 688 are each provided, adjacent their bottom edge, with a slide bar or feather 690 (FIG. 3). Each slide bar comprises a length of square-section bar stock that is disposed horizontally along the bottom of the outer face of the associated plate 688. The plates 688 with the slide bars 690 thereon, comprise the two slides which are received in the guideways of the bracket 382 of the machine.

As best shown in FIGS. 2 and 4, the hopper floor 683 is provided along its lateral edges with side walls 696. At the rear end of the floor 683 (FIG. 4) the walls 696 converge (FIGS. 2 and 5) and are formed with parallel panels 698 which are spaced inwardly of the hopper from the lateral edges of the floor 683 to provide the hopper 680 with a mouth 700 of restricted transverse dimensions.

The edges of the panels 698 at the rear of the hopper are disposed vertical throughout a major portion of their length.

As best shown in FIGS. 2, 4 and 5, an end wall 702 of modified channel shape, having side flanges 704 that are interconnected by a transversely disposed web 706, is provided to close the rear end of the hopper. The flanges are suitably apertured (not shown) in order to pivotally mount the wall 702 on laterally extending studs 708 that project outwardly from the panels 698. It will be noted that the web 706 (FIG. 5) is in the form of a shallow V, providing the end wall 702 with two converging deflector surfaces 710 interiorly of the hopper. When mounted as above described, the end wall is free to swing about the studs 708 between the positions shown in FIG. 1 and in FIG. 3. The lower rear corner of the panels 698 and the upper front corners of the side flanges 704 are cut away in order to prevent interference between the hopper and the end wall 702 during movement of the same.

The present orange hopper 680 is arranged to hold open the bag 681 (FIG. 1) into which the oranges are deposited directly. For this purpose, two knobs 714, which are aligned transversely of the hopper, are provided on the support member 684 below the hopper mouth 700 and two transversely aligned knobs 716 are provided on the flanges 704 of the end wall 702. The knobs 714 are attached to the hopper by means of shanks 718 which are threadedly disposed in blocks 720 (FIG. 4) that are suitably secured to the before mentioned hopper mounting member 684. Vertical adjustment of the knobs 714 may be made in a well known manner, after which they are locked in the adjusted position by lock nuts 722.

The knobs 716 are mounted by means of shanks 724 (FIGS. 3 and 4) in elongated blocks 726 that are suitably attached to the outside of the side flanges 704 at the bottom thereof. It will be noted (FIG. 5) that the blocks 726 which extend longitudinally of the hopper are each provided with a series of three spaced holes 728. In order to attach the two knobs 716 to the end wall 702, the shanks 724 are threadedly disposed in a pair of the holes 728 which are arranged in alignment transversely of the hopper. After suitable vertical adjustment of the knobs 716, a lock nut 730 on each of the shanks 724 is employed in a well known manner to retain the knobs 716 in position. The remaining pairs of transversely aligned holes 728 in the blocks 726 are employed when the knobs 716 are to be moved relative to the knobs 714 so as to accommodate the spacing of the knobs 714 and 716 to bags of different diameter.

The end wall 702 of the hopper may be pivoted about the studs 708 from the position of FIG. 1 into the position shown in FIG. 3, wherein the knobs 716 are moved closer to the knobs 714, with the shanks 724 disposed at an oblique angle so that the open end of the bag 681 can be easily placed about the knobs 714 and 716 or removed therefrom. In order to yieldably retain the end wall 702 in either the FIG. 1 or the FIG. 3 position, two tensile springs 732 are provided. The springs 732 are disposed at opposite sides of the hopper 680 and are stretched between the support member 684 at one end and spring attaching tabs 734 (FIG. 5) on the web 706 of the end wall 702 at the other.

A hopper switch 418c (FIG. 1) which is identical to a similarly positioned switch described in the aforementioned application Serial No. 192,543, is slidably disposed on a suitable bracket 736 that projects vertically from the slide plate 688 at the left side (FIG. 2) of the orange hopper 680. The switch 418c is held closed when the hopper is in article receiving condition. A lever 738, provided for this purpose, is pivotally mounted by means of a pivot pin 740 adjacent the left hand end of the member 684 (FIG. 2). The lever 738 is formed so that when the rear end 742 thereof (FIG. 3) lies substantially flat against the support member 684, the other end of the lever will be released from engagement with the actuator 422c of the switch 418c. The lever 738 is operatively interconnected with the rear end wall 702 by means of a link 744 (FIG. 2) which is pivotally attached to the rear end 742 of the lever by means of a pin 746, and to a stud 748 on the block 726 on the adjacent flange 704. When the lever 738 lies with its end 742 against the member 684 (FIGS. 3 and 4), the knobs 716 are disposed adjacent the knobs 714.

It will be noted from FIGS. 1 and 3 that the springs 732 are attached to the end wall 702 at such a point as to have an over center action when the end wall is pivoted about the studs 708. Such action assures that the bag 681 will be held securely in place when the end wall 702 is drawn by the springs 732 against the rear edge of the panels 698 (FIG. 1). Under such a condition, the rear end of the springs 732 will be disposed above the studs 708 (FIG. 1) and the link 744 will pivot the lever 738 into engagement with the switch actuator 422c and close the switch 418c. When the end wall 702 is moved by an attendant so that a bag may be removed from or attached to the hopper 680, the rear ends of the springs will be disposed below the studs 708 to yieldably retain the end wall 702 in a position in which contact of the end 742 of the lever 738 with the member 684 holds the end wall in the FIG. 3 position. At the same time, the lever 738 is held out of engagement with the switch actuator 422.

While the bag 681 is held open by the knobs 714 and 716, it is not practical to support the entire weight of a bag filled with oranges by the knobs. Therefore, the table or platform 582 is provided below the hopper mouth 700 and is arranged to receive the bottom of the bag 681. In order that the table 682 can move with the hopper 680, as oranges entering the bag lower the hopper in the associated weighing machine F, the table 682 is dependently attached to the rod support member 684.

As best seen in FIGS. 1, 2 and 4, the platform 682 comprises a flat plate 752 large enough for the bottom of the bag 681 to rest upon. The plate 752 is attached in any convenient manner adjacent its front end to a vertical tube 754 and projects in cantilever fashion from the lower end of the tube. It will be understood from FIGS. 1 and 4 that the wall of the tube at the front thereof is provided with a vertical opening 756 which is open at the top of the tube. The upper part of the opening 756 is in the form of a narrow slit, the walls of which fit closely adjacent each side of a tongue 758 that extends downwardly from the upper support member 684. At the upper end of the tube 754 is a pin 760 that extends transversely across the tube.

It is the purpose of the tongue 758 to suspend the table 682 as may be seen in FIG. 1. The tongue 758 is rigidly affixed to an angle bracket 762 that is in turn secured to the front side of the support member 684. The tongue is of a width corresponding closely to the width of the upper part of the opening 756 in the tube 754 and is provided in its rear edge with a series of upwardly and rearwardly inclined notches 764. Referring to FIG. 4, the table is hung from the hopper 680 by disposing the pin 760 of the tube 754 in a suitable one of the notches 764 in the tongue.

When the hopper 680 is suitably positioned in the U-shaped bracket 382 of the machine, a bag 681 is disposed about the knobs 714 and 716 in a manner previously described. The end wall 702 is moved to a vertical position (FIG. 1) so that the switch actuating lever 738 will be brought into position against the switch actuator 422c to close the switch 418c. Next, the spacing of the table 750 from the hopper is adjusted by disposing the pin 760 in a suitable one of the notches 764 in the tongue 758. The recess 756 in the forward wall of the tube 754 provides clearance between the tube and the weighing machine F (FIG. 1) when the hopper 680 is suitably positioned adjacent the bagger.

During delivery of oranges to the hopper 680, because of the relatively large size of the fruit, only one or two oranges enter the hopper at a time. In entering the hopper, the oranges roll down the floor 683 thereof and against one or the other of the deflector surfaces 710 (FIG. 5) of the end wall 702.

Upon delivery of a predetermined weight of oranges to the hopper 680 by the bagger, as explained in said application Serial No. 192,534, further delivery of oranges to the hopper is discontinued. Thereafter, the attendant, by grasping the top edge of the end wall 702, pivots the same into the position shown in FIG. 3 which is effective to open the switch 418c by disengagement of the lever 738 therewith. The open upper end of the bag 681 is released from the knobs 714 and 716 so that the entire weight of the filled bag rests upon the table 682. The attendant then removes the filled bag from the table 682, places an empty bag with its open, upper end about the knobs 714 and 716, and returns the end wall 702 to the position shown in FIG. 1. The return of the end wall to the abovedescribed position indicates an article receiving condition of the hopper, in which condition the switch 418c is closed.

It will be apparent from the foregoing description that the hopper of the present invention has several improved features. Among these features are the adjustibility of the hopper assembly in its mounting, the adjustment of the walls of the apple hopper to vary its capacity, the system for controlling the time of discharge of articles from the apple hopper, the apparatus for releasably retaining a bag in article receiving position on the orange hopper, the bag support table which is adjustable with respect to the movably mounted orange hopper, and the means for operating the hopper controlled conveyor switch and for preventing the switch from being actuated when the hopper is in article discharging condition.

While particular embodiments of the present invention have been shown and described it will be understood that the present article handling apparatus is capable of modification and variation without departing from the principles of the invention and that the scope of the invention should be limited only by the scope and proper interpretation of the claims appended thereto.

The invention having thus been described, what is believed to be new and desired to be protected by Letters Patent is:

1. In an article receiving hopper, an elongate floor, opposite side wall portions on said floor projecting longitudinally of said floor beyond one end thereof, said one end of said floor and the projecting side wall portions defining three sides of a throat in said hopper to accommodate articles moving therefrom, first bag engaging means projecting downward at one side of said throat adjacent said one end of said floor, pivot means extending across said throat opposite said one end of said floor and having an axis of rotation extending transversely of said hopper, second bag engaging means projecting downward from said pivot means, and resilient means urging said pivot means to rotate about the axis thereof to swing said second bag engaging means away from said first bag engaging means to retain the mouth of a bag disposed about said first and second bag engaging means in open condition beneath said throat.

2. In an article receiving hopper, an elongate floor, opposite side wall portions on said floor projecting longitudinally of said floor beyond one end thereof, said one end of said floor and the projecting side wall portions co-operating to define three sides of a throat in said hopper to accommodate articles moving therefrom, first bag engaging means projecting downwardly from substantially beneath said one end of said floor at one side of said throat, second bag engaging means projecting downward from a location spaced from said one end of said floor and mounted in said projecting side wall portions for pivoting movement about an axis extending transversely of said hopper, and a spring connected under tenison to said second bag engaging means, the point of attachment of said spring to said second bag engaging means being such that upon pivotal movement thereof said point of attachment is moved between locations above and below said axis, whereby when said point of attachment is above said pivot axis said second bag engaging means is resiliently urged in a direction to hold the mouth of a bag disposed about said first and second bag engaging means in open condition beneath said throat and when said point of attachment is below said pivot axis said second bag engaging means is urged in a direction to release such a bag.

3. In an article receiving hopper, an elongate floor, opposite side wall portions on said floor projecting longitudinally of said floor beyond one end thereof, said one end of said floor and the projecting side wall portions cooperating to define three sides of a throat to accommodate articles moving from said hopper, first bag engaging means projecting downward from substantially beneath one end of said floor at one side of said throat, second bag engaging means, mounting means mounted in said throat opposite said one end of said floor for swinging movement about an axis extending transversely of said hopper, said second bag engaging means projecting downward from said mounting means and being adjustable thereon toward and away from said first bag engaging means to accommodate bags of different diameters, and resilient means urging said mounting means in a direction to swing said second bag engaging means away from said first bag engaging means to retainingly engage the inner surface of the open end of a bag disposed about said first and second bag engaging means and hold the bag open beneath said throat.

4. In an article receiving hopper, an elongate floor, opposite side wall portions on said floor projecting longitudinally of said floor beyond one end thereof, said one end of said floor and the projecting side wall portions cooperating to define three sides of a throat to accommodate articles moving from said hopper, a slanting wall portion at the other side of said throat opposite said end of said floor and arranged to laterally deflect articles toward the center of the throat as they move from the hopper, first bag engaging means projecting downward from substantially beneath said one end of said floor at one side of said throat, pivot means at said other side of said throat and having an axis of rotation extending transversely of said hopper, second bag engaging means projecting downward from said pivot means, and resilient means urging said pivot means to swing about the axis thereof and to move said second bag engaging means away from said first bag engaging means to retain the open end of a bag disposed about said first and second bag engaging means in position beneath said throat.

5. In an article receiving hopper, means defining three sides of a throat through which articles are discharged from said hopper, first bag engaging means projecting downward from beneath the second of said three sides, pivot means in said hopper spaced from said second side of said throat at the other side thereof and having an axis of rotation extending transversely of said hopper in substantially parallel relation to said second side of said throat, a slanting wall portion fixed to said pivot means at said other side of said throat, second bag engaging means projecting downward from said pivot means and resilient means urging said pivot means to rotate about the axis thereof to swing said second bag engaging means away from said first bag engaging means into a bag retaining relation with respect to said first bag engaging means, said slanting wall portion being so positioned upon disposition of said second bag engaging means in bag retaining relation with respect to said first bag engaging means as to laterally deflect articles toward the center of the throat as they move from the hopper and establish the article receiving condition of the hopper.

References Cited by the Examiner

UNITED STATES PATENTS

| 2,458,228 | 1/1949 | Vredenburg | 141—315 X |
| 2,608,331 | 8/1952 | Hoffman | 53—261 |

LAVERNE D. GEIGER, *Primary Examiner.*

SAMUEL ROTHBERG, *Examiner.*

H. BELL, *Assistant Examiner.*